United States Patent [19]

Ishitani

[11] Patent Number: 5,506,918
[45] Date of Patent: Apr. 9, 1996

[54] DOCUMENT SKEW DETECTION/CONTROL SYSTEM FOR PRINTED DOCUMENT IMAGES CONTAINING A MIXTURE OF PURE TEXT LINES AND NON-TEXT PORTIONS

[75] Inventor: Yasuto Ishitani, Matsudo, Japan

[73] Assignee: Kabushiki Kaisha Toshiba, Kawasaki, Japan

[21] Appl. No.: 996,106

[22] Filed: Dec. 23, 1992

[30] Foreign Application Priority Data

Dec. 26, 1991 [JP] Japan .................................. 3-345419

[51] Int. Cl.$^6$ .................................................. G06K 9/36
[52] U.S. Cl. ........................... 382/289; 382/173; 382/176
[58] Field of Search ................................. 382/46, 18, 9, 382/289, 290, 296, 297, 173, 174, 176, 180, 205; 345/126

[56] References Cited

U.S. PATENT DOCUMENTS

| | | | |
|---|---|---|---|
| 4,251,799 | 2/1981 | Jih .............................................. | 382/18 |
| 4,503,556 | 3/1985 | Scherl et al. ................................. | 382/9 |
| 4,528,692 | 7/1985 | Umeda et al. ................................ | 382/9 |
| 5,001,766 | 3/1991 | Baird .......................................... | 382/46 |
| 5,285,504 | 2/1994 | Pavlidis et al. ............................. | 382/46 |
| 5,335,290 | 8/1994 | Cullen et al. ............................... | 382/46 |
| 5,359,677 | 10/1994 | Katsurada et al. ......................... | 382/46 |

FOREIGN PATENT DOCUMENTS

6252337 11/1962 Japan .

OTHER PUBLICATIONS

Proc. of 10th International Conference on Pattern Recognition, 1990, pp. 464–468, S. C. Hinds, et al., "A Document Skew Detection Method Using Run–Length Encoding and . . . ".

Proc. of Society of Photographic Scientists and Engineers, vol. 40, pp. 21–24, 1987, H. S. Baird, et al., "The Skew Angle of Printed Documents.".

IEICE Transactions, vol. J66–D, No. 1, 1983, pp. 111–118, T. Akiyama, et al., "A Segmentation Method for Document Images Without the Knowledge . . . ".

Official Gazette, U.S. Pat. No. 5,001,766; p. 1754, H. S. Baird, et al., May 16 1988, "Fast Spatial Segmenter for Handwritten Characters.".

*Primary Examiner*—Joseph Mancuso
*Attorney, Agent, or Firm*—Oblon, Spivak, McClelland, Maier, & Neustadt

[57] ABSTRACT

A document skew detection apparatus for facilitating the recognition of the contents of a printed document includes an image processing section for generating a binary coded image of the document containing a plurality of black picture elements distributed among white picture elements to depict pure text lines and non-text portions of the document. The binary coded image is then modified so that certain ones of the black picture elements satisfying a predetermined condition are integrated together to generate a coarse document image being decreased in resolution. The apparatus also includes an image extraction section for extracting from the document image a local image region containing pure text lines occupying an almost entire area thereof, and skew detection section for detecting a direction of orientation of the text lines of the local region, and for determining an angular difference between a detected direction and a reference direction as a skew angle of the printed document.

18 Claims, 8 Drawing Sheets

DOCUMENT SKEW DETECTION/CONTROL SYSTEM FOR PRINTED DOCUMENT IMAGES CONTAINING A MIXTURE OF PURE TEXT LINES AND NON-TEXT PORTIONS

BACKGROUND OF THE INVENTION

1. Field of the Invention

The present invention relates generally to document information processing, and more particularly to a preprocessing technique for electronic digital equipments which include a document read device and which are preferably applied to a document image processing apparatus such as a pattern recognition apparatus, an automatic syntactic analysis apparatus, a document information filing apparatus or the like. This invention relates more specifically to detection of a skew angle of document image.

2. Description of the Related Art

With the increasing development in high performance and reliability of digital computer systems, an electronic apparatus for processing printed documents is becoming important more and more. Such electronic document processing apparatus typically includes a pattern recognition apparatus, a syntactic analysis apparatus, a document information filing apparatus, and so forth, which employ, at their input stage, a document reader device for optically scanning the printed face of an input document to generate a corresponding electric information signal representing the contents of the document. The document reader may include an optical character reader or OCR, which makes an operator or user free from cumbersome works of manually inputting by using a conventional input tool, such as a keyboard unit, the text information of an input document into electronic files capable of being accessed by a computer. This may improve the efficiency of document input works in offices.

While the document reader devices are growing in performance with the recent development in the electronic technology, it cannot be said that the reading accuracy reaches a perfectly satisfactory level as required. This can be said because there are no guarantees for an input printed document to be put correctly on a scanning base plate without the occurrence of any skew. If the printed document is skewed, the character-read results are naturally poor in reliability.

An automatic document skew detection apparatus automatically detects the occurrence of an unintentional skew of the image of a printed document; the apparatus is important to facilitate the recognition of the contents of the document. Until today, several techniques have been proposed for document skew detection. By way of an example, there is known in the art a technique for searching for a ruled line (such as a cutoff rule, a hairline rule, etc.) in the image of an input document, and for, if it is found, determining the document skew angle with the detected line being as a reference direction. Generally, the ruled line is drawn in either the horizontal direction or the vertical direction of the document; if such line is detected correctly, the document skew angle will be detected accurately. However, this "ruled line" based document skew detection method is not almighty; obviously, if the input document contains no ruled lines, the method can no longer detect the document skew.

Another document skew detection method is disclosed in "A Segmentation Method for Document Images without the Knowledge of Document Formats)," by Teruo Akiyama et al., the Transactions of the Institute of Electronics, Information and Communication Engineers, paper D-15, Vol. J-66-D, No. 1, at pp. 111 to 118 (1983). With this prior art, the image of an input document is binary-coded such that its contents are represented by a set of a number of black picture elements (pixels) and white pixels. These black and white pixels are scanned along selected angles of projection to search for a specific direction in which the black pixels exhibit the sharpest peak in the peripheral distribution thereof. The angle of this direction is determined as a document skew angle with respect to a predetermined reference direction, which may correspond to either one of the horizontal direction and the vertical direction. With such a scheme, however, there is a drawback of an undesirable increase in the total processing time required to fully execute the document skew detecting operation. In addition, the skew detection results are not satisfactory. This will become more serious if the input document contains not only pure text lines but also non-text portions (such as line drawing, graphics or photographic image, etc.).

Still another document skew detection method is disclosed in "A Document Skew Detection Method using Run-Length Encoding and the Hough Transform," by Stuart C. Hinds et al., IEEE, Proc. of 10th International Conference on Pattern Recognition, at pp. 464–468 (1990), wherein a document skew detection is attained by applying the Hough transform to either the horizontal burst image or the vertical burst image. This document skew detecting method may remain effective for some printed documents that partially contain line drawings, graphics, or photographic images. However, the method suffers from the impossibility of attaining an accurate skew detection when the text portion is less in area than the non-text region in the input document image. The method also suffers from the fact that entire processing system is complicated, and that it necessitates the employment of a large-scale computer equipment in order to attain a desired detection speed and accuracy.

SUMMARY OF THE INVENTION

It is therefore an object of the present invention to provide a new and improved document skew detection technique.

It is another object of the invention to provide a new and improved document skew detection system that attains high performance and reliability.

In accordance with the above objects, the invention is drawn to a specific technique for detection of document skew. When a printed document is input which may contain a plurality of lines of text characters and a non-text portion such as a picture image, graphics, and/or line drawings, an input device generates a corresponding image of the input document. A skew detection device is provided for iteratively computing a group of predefined kind of variable quantities or parameters representing a complexity of image pattern, with respect to a plurality of parallel scanning lines which cross the document image at selected angles that vary intermittently from a reference angle, for finding out a characteristic parameter in a distribution of the parameters, and for determining a corresponding angle at which the characteristic parameter occurs as the skew angle of the input document. An output device is coupled to the skew detection device, for generating a signal indicative of the skew angle thus detected. The document skew detection is enhanced by additionally employing an image extraction device coupled to the input device and the skew detection device, for extracting from the document image one or a plurality of local regions which may contain pure text portions occupying an almost entire area thereof, and for supplying the skew detection device with an extracted local region.

The foregoing and other objects, features, and advantages of the invention will become apparent from the following more particular description of preferred embodiments of the invention, as illustrated in the accompanying drawings.

DETAILED DESCRIPTION OF THE PREFERRED EMBODIMENTS

Figure 1:
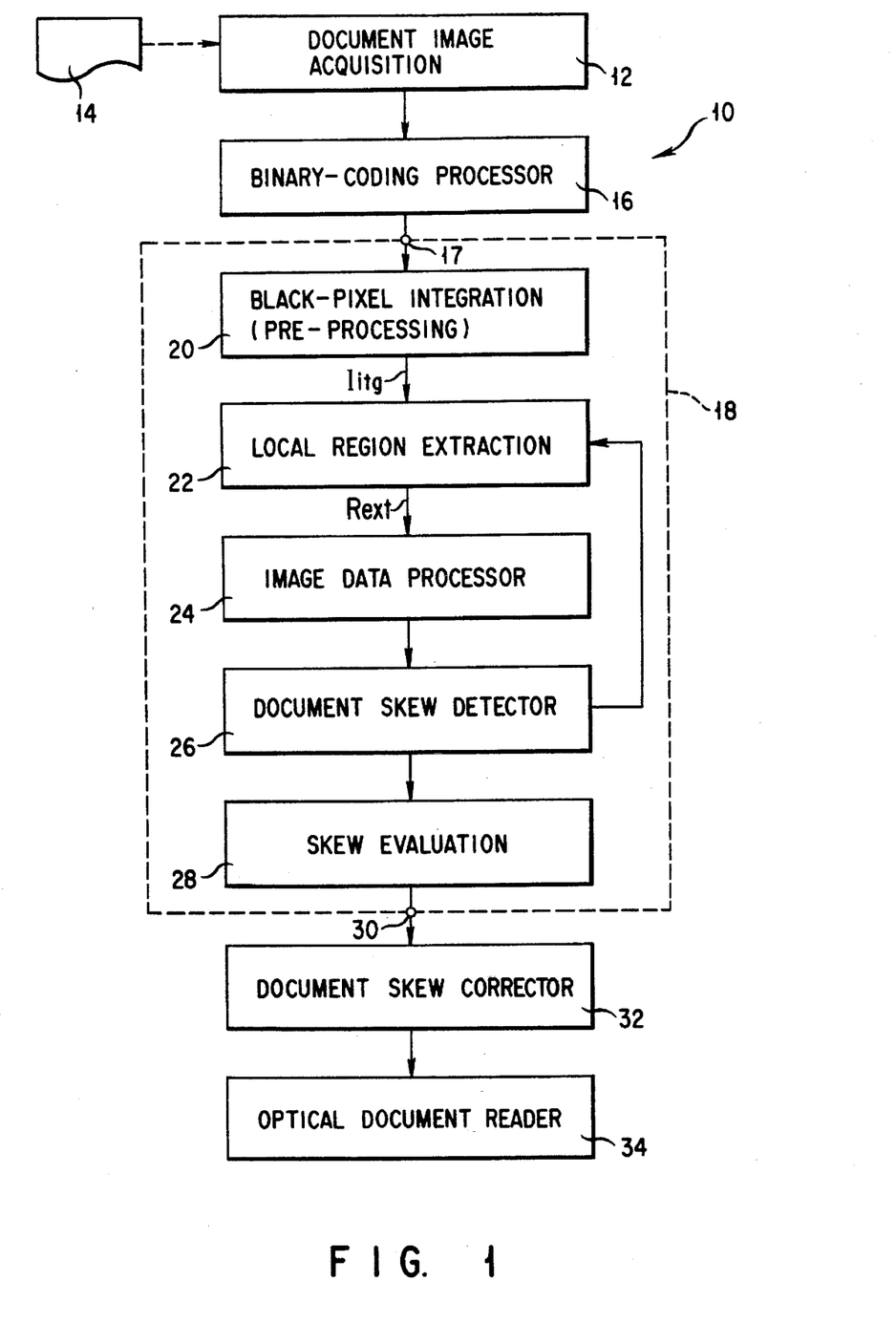
FIG. 1 is a block diagram showing the overall construction of a document skew detection apparatus in accordance with one preferred embodiment of the present invention.

Referring now to FIG. 1, a document skew detection apparatus in accordance with one preferred embodiment of the present invention is generally designated by the numeral 10. The document skew detection apparatus 10 includes an input document image acquisition section 12, which optically scans and reads the contents of an input printed document 14 to produce an electrical image signal indicative of the document image. Document image acquisition section 12 may include a known optical image scanner (OCR). Input document 14 may include a printed document containing a mixture of pure text information and non-text information portions such as line drawings, graphics images or pictures.

The document image acquisition section 12 is coupled to a binary-coding processing section 16, which receives the image signal and executes a binary coding processing to generate a binary coded document image signal. The binary coded document image consists of two kinds of digital picture elements: black pixels and white pixels. The image signal is supplied to an input terminal 17 of a document skew detection section 18, which includes a black-pixel integration unit 20.

The black-pixel integration unit 20 carries out, as a pre-processing for document skew detection, a black pixel integration processing for the binary coded image supplied thereto in such a manner that, when the binary coded document image includes a white pixel that is positioned between adjacent ones of continuous black-pixel portions and is less in length than a predetermined value L0, the white pixel is converted into a black pixel. This results in that the converted black pixel is merged or integrated with the adjacent block pixels to create a contiguous line of black pixels in the binary coded document image. The integration of black pixels may be performed along one of the horizontal and vertical directions of the document or the both of them. A resultant black-pixel integrated document image Iitg is decreased in the total number of white pixels.

The black-pixel integrator 20 is coupled at its output to a local image region extraction unit 22, which receives the black-pixel integrated document image Iitg and extract therefrom one or a plurality of image regions of interest Rext having a specific shape and a preselected area. The extraction of such local region Rext is basically achieved by cutting out of or extracting from the image of input document 14 a certain region that essentially consists of pure text lines, which occupies an almost entire area of it. The extraction scheme will be explained in detail later in the description.

The local region extraction unit 22 is coupled to an image data processing unit 24, which performs a rearrangement including data compression of the extracted local region Rext (text image) as needed, and necessary data management therefor. Image data processor 24 is connected to a document skew detection unit 26. This unit detects a skew angle of text lines in local region Rext on the basis of the data managed by data processor 24 in accordance with a selected algorithm or scheme as will be described later, thereby to determine the skew angle $\Theta$ of the image of input document 14.

The document skew detector 26 is connected at its output to a skew evaluation unit 28. Unit 28 holds or stores temporarily the results of skew detection supplied by the document skew detector 26, and evaluates the reliability or "probability" of the detected skew angle $\Theta$. If a decision is made where the detected skew angle $\Theta$ is lower in the reliability, unit 28 may reject the detection result. If this is the case, unit 28 issues an instruction for requesting local region extractor 22 to extract a different local region Rext from the input document image. If a decision is made where the detected skew angle $\Theta$ is high in reliability, an electrical signal representing the skew detection result appears at an output terminal 30 of the document skew detector 18, and is then supplied to a document skew correction section 32. Document skew corrector 32 performs, in response to the skew detection result, a skew correction or compensation operation for the input document image. A resulting skew-corrected document image is fed to an optical document reader 34. Document reader 34 reads the contents of input document 14 to produce, in the efficiently stored, computer-searchable form, an electronic meaningful text information for a digital computer system (not shown)—such as a pattern recognition apparatus, a syntactic analysis apparatus, a document information filing apparatus, etc.— associated with the document skew detection apparatus 10.

The operation of the document skew detection apparatus 10 is as follows. When the printed document 14 is input, the document image acquisition section 12 generates an electrical representing the image information of input document 14, which is a multiple-value digital image information signal. This signal is then supplied to the binary coding processor 16, which binary-codes the multiple-value document image to produce a binary coded image that consists of a number of "black" pixels and "white" pixels. These two kinds of pixels may correspond in density value to the logic "high" (1) and "low" (0) levels. When the input document image contains at least partially a non-text portion (such as a line drawing, graphics image and/or a picture image) in addition to ordinary text lines, the non-text portion is also converted into a corresponding binary coded image information.

The black-pixel integrator 20 scans the binary coded document image along a plurality of parallel scanning lines in a selected direction to detect black and white pixels of variable length that are aligned along each scanning line. Of these pixels, a certain portion consisting of linearly continuous black pixels is called the "continuous black-pixel portion." When a white pixel portion that is positioned between adjacent ones of the continuous black-pixel portions is shorter than a suitably selected reference length L0, such white pixel is converted into a black pixel to generate an extended black-pixel portion being increased in length. The pixel "integration" processing is applied to the binary coded document image both in the horizontal direction and in the vertical direction. This results in that unnecessarily fine binary coded document image is transformed into a suitable document image being coarse moderately in pixel (dot) density. The "black-pixel integration" processing, which may alternatively be called the "smearing" process, is known among those skilled in the art; one of such techniques is described, for example, in "Block Segmentation and Text Extraction in Mixed Text/Image Documents," by Wahl F. W. et al., Computer Graphics and Image Processing 20, at pp. 375–390, 1982. Executing the smear processing causes the white pixels to decrease in number in a resultant image. This reduces the required amount of computing the "complexity" (to be explained in detail later in the description) in the document skew detector 26; it also enhances the noise-withstanding characteristic of the local region Rext extracting operation in local region extractor 22, thereby to suppress or prevent the occurrence of erroneous extraction of a non-text region.

Figure 2:
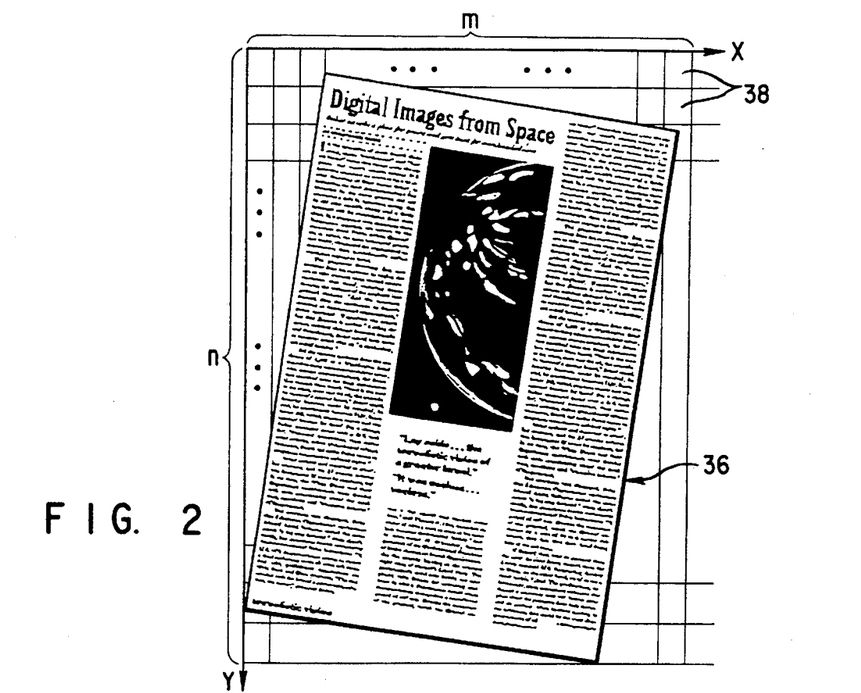
FIGS. 2 and 3 are diagrams showing the main processes of a local text region extraction operation to be performed by a local region extraction unit of FIG. 1.

The local region extraction unit 22 of FIG. 1 extracts or "cuts off" a suitable text region from the black pixel-integrated (i.e., smear-processed) document image Iitg. The basic scheme of this local region extracting operation is as follows. Assume, for purposes of explanation, that the smear-processed document image 36 is skewed with respect to a reference direction (the horizontal direction X or the vertical direction Y) as shown in FIG. 2. The entire image containing the skewed document image 36 is subdivided or partitioned into an array of unit sections consisting of m rows and n columns. Note in FIG. 1 that the division of image is illustrated as a model in such a manner that each section is enlarged in size for purposes of illustration only.

The divided image is then subjected to a transition number counting process wherein the transition number Ni of the black and white pixels is counted in either the horizontal direction X or the vertical direction Y. The transition number Ni may be defined as a number of transition points between the black and white pixels aligned along a scanning line. Suppose that the horizontal direction X is used. A respective count value obtained for each of the n rows of sections 38 is stored temporarily in the local region extractor 22. The count values in each section are added together, and the sum of count values is defined as a "variable" representing the nature of an image pattern in each section. On the basis of the computed image-pattern variable, local region extractor 22 determines whether each section 38ij (where, 0<i< m, 0<j<n) is a text or a non-text by referring to the general tendency or characteristics regarding the "frequency" of transition number Ni of the text regions and non-text regions. The "general teachings" are as follows: Principally, the transition number Ni of text characters is greater than those of line drawings, tables and charts, and yet less than that of photographic images being binary coded by a dither method. When the invention is reduced to practice, the selection of a practical "threshold" level for determining whether a section in subject is a text or a non-text will be achieved by those skilled in the art without need of any additional inventive activity.

Figure 3:
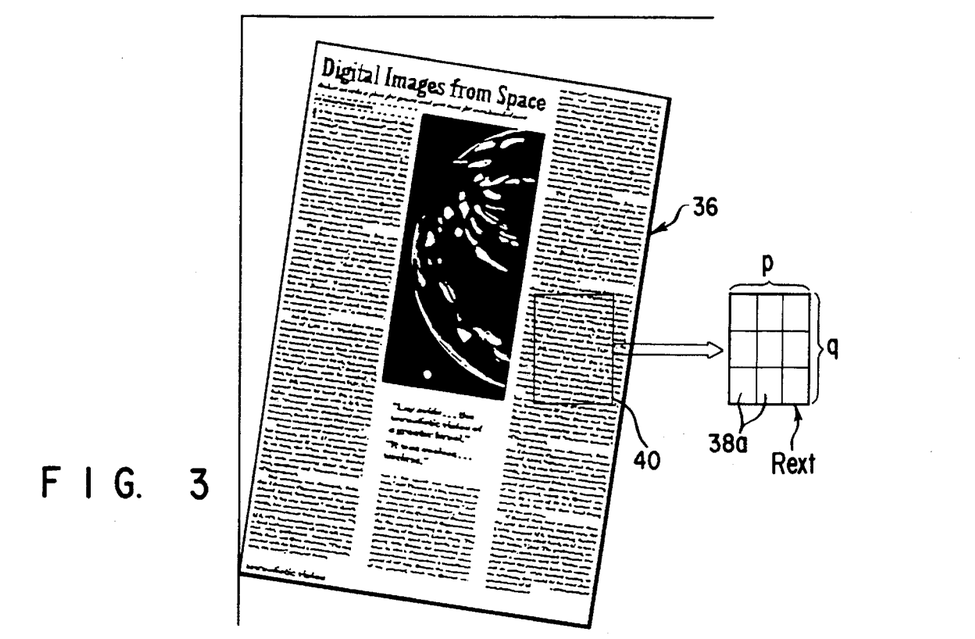

The local region extractor 22 of FIG. 1 distinguishes those of the unit sections 38 which are judged as the most likely text regions from the remaining sections judged as non-text regions. As shown in FIG. 3, when a text region 38a is identical with a rectangular area 40 of a predetermined size, a decision is made to determine it as a local region Rext of interest. The model of FIG. 3 assumes that it consists of p rows and q columns of unit text regions 38a. It may possibly occur that a plurality of sections meet the above condition. If this is the case, local region extractor 22 holds or stores therein these sections as a list of "candidates" or alternates in a searchable manner.

When a certain extracted local region Rext is supplied to the image data processor 24 of FIG. 1, this processor then compresses the image data of local region Rext with respect to each of parallel scanning lines in either the horizontal direction X or the vertical direction Y or in the both. The image data compression is aimed at improving of the processing efficiency by reducing the required amount of computation for the document skew detecting operation. Note that the data management of unit 24 may alternatively be modified as follows. In the first place, the image data of local region Rext is represented as an array of a series of run-length codes of certain bits (eight bits, for example) in either one of the horizontal and vertical directions or the both thereof. In this case, the first bit of the code array is an identify code indicative of whether a black pixel or a white pixel; the following seven code bits are binary codes representing the run length. Secondly, a data management is performed on the basis of the frontmost coordinates (or center coordinates) of continuous black pixels of local region Rext along each scanning line in either the horizontal direction X or the vertical direction Y. In such case, it should be required that the frontmost coordinates of each continuous black pixel portion are normalized in accordance with the coordinate value at the left side of local region Rext. The normalization may be attained by subtracting the coordinate value of left side of local region Rext from the coordinate value of each black pixel.

The output image of the image data processor 24, which represents the extracted local region Rext, is supplied to the document skew detector 26. Document skew detector 26 performs a skew detection operation with respect to the image of local text region Rext given thereto. The skew detection is carried out by detecting the actual direction of text lines in local region Rext. The direction of text lines means that a specific direction along which the text characters are aligned continuously in the input document 14: this embodiment assumes that the input document is an English document having the portrait orientation, and that the text direction is therefore a row direction (horizontal direction).

A description is now given of the principle of the document skew detection as follows. To facilitate an understanding of it, the following discussions assume that a skew detection is applied to the document image 36 as described previously. See FIG. 4, which shows the smear-processed document image 36 that is skewed by a certain angle. The skew angle is $\theta$.

Figure 4:
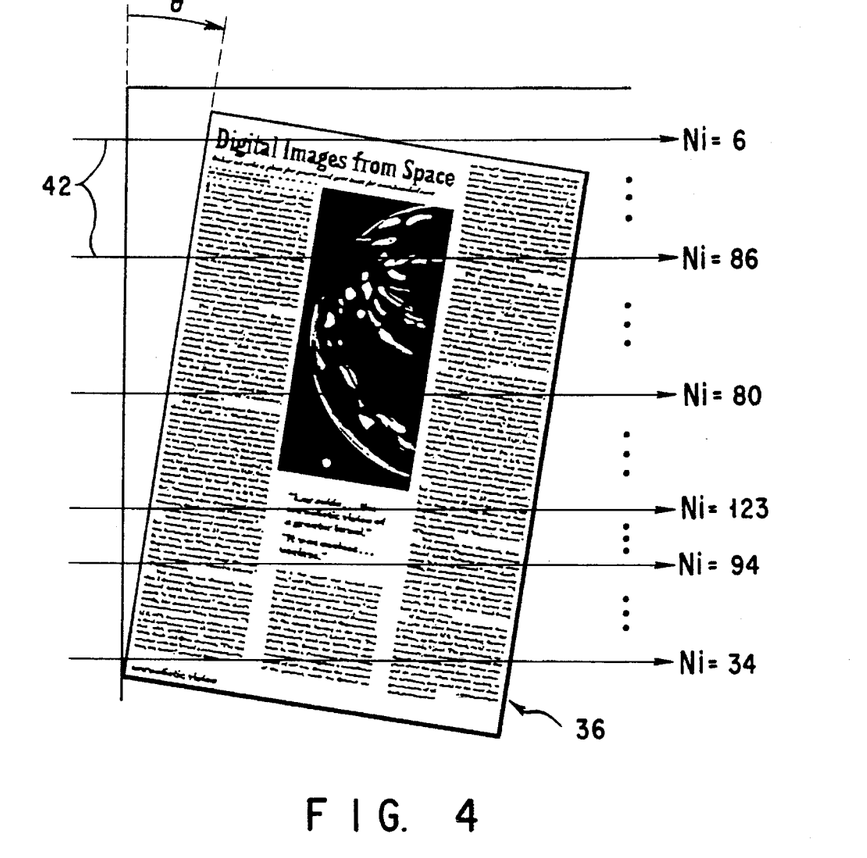
FIG. 4 illustrates a model of the computation of a plurality of transition numbers Ni with respect to respective one of scanning lines crossing a skewed document image.
Figure 5:
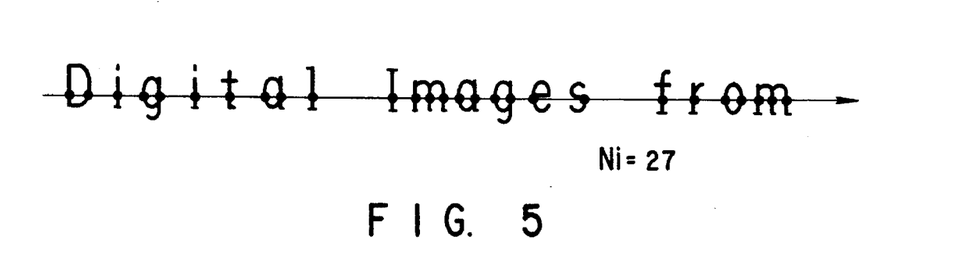
FIG. 5 is an illustration that models the count operation of a transition number Ni of a document text image.

The document image 36 is first subjected to a computation of "complexity" C with respect to a preselected number of parallel scanning lines 42 extending in a selected direction. The complexity C is defined as a specific variable quantity or parameter that represents a variance value of the distribution of the transition numbers Ni between the above mentioned continuous black pixel portions and white pixel portions with respect to a plurality of parallel scanning lines at a selected angle. Explaining about a model illustrated in FIG. 5, the value of transition number Ni is the count value of a plurality of crossing points of one scanning line with the continuous black pixel portions (i.e., the number of continuous black pixel-portions on a scanning line). The illustration of FIG. 5 assumes that the scanning line is identical with a text line for purposes of explanation only. Accordingly, the transition number Ni is counted as twenty-seven in this model. Applying a similar counting operation of the transition number Ni to the example of FIG. 4, count values are obtained as presented in FIG. 4. The presentation in FIG. 4 is prepared so that the count values are shown with respect to some typical ones picked up from the scanning lines 42 only in order to eliminate intricacy of illustration.

On the basis of the above transition numbers Ni of various values, the complexity C at a presently selected scanning angle is given as follows:

$$C = (1/N) \cdot \Sigma\{(Ni - M)^2\}, \quad (1)$$

where N is the total number of scanning lines 42, and M is the average value of transition numbers Ni. The value "M" is represented by:

$$M = (\Sigma Ni)/N. \quad (2)$$

The computation of the complexity C of an object image will be executed iteratively with respect to different scanning directions, which are varied intermittently by a selected angular pitch. The setting of the angular pitch (i.e., angle resolution) of scanning lines 42, which will determine the total number of necessary scanning lines, may be made by taking into consideration the power of a computer employed. If the situation permits the employment of a powerful computer system, the angle resolution can be set as smaller as possible. However, there is a trade-off: Making the angle resolution smaller can improve the accuracy of skew detection, but making it too small can also degrade performance; it takes longer in time to detect a document skew angle.

The varying range of the scanning lines 42 may be determined with the horizontal direction X (=0 degrees) being as a reference direction as follows:

$$-\alpha < 0 < +\alpha, \quad (3)$$

where $\alpha$ is a limit angle, which may be determined by taking into consideration the document skew angle that will possibly occur; for example, $\alpha = 32$ degrees in this embodiment. The angle resolution is selected to be 1 degree. Under such a condition, while the direction of parallel scanning lines 42 is changed sequentially by angle resolution $\sigma$ from the horizontal direction X, the transition numbers Ni are computed at a direction presently selected to provide corresponding complexities C therefor.

Figure 6A:
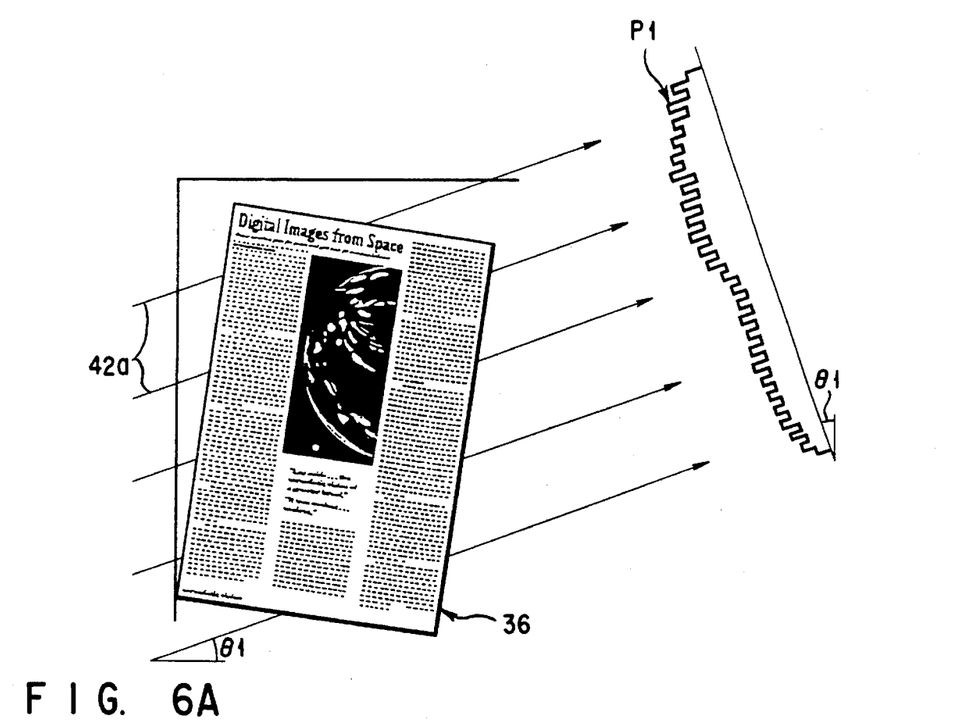
FIGS. 6A and 6B illustrate two possible examples for a document skew detection operation, wherein a plurality of parallel scanning lines are determined in different directions to obtain the complexities.
Figure 6B:
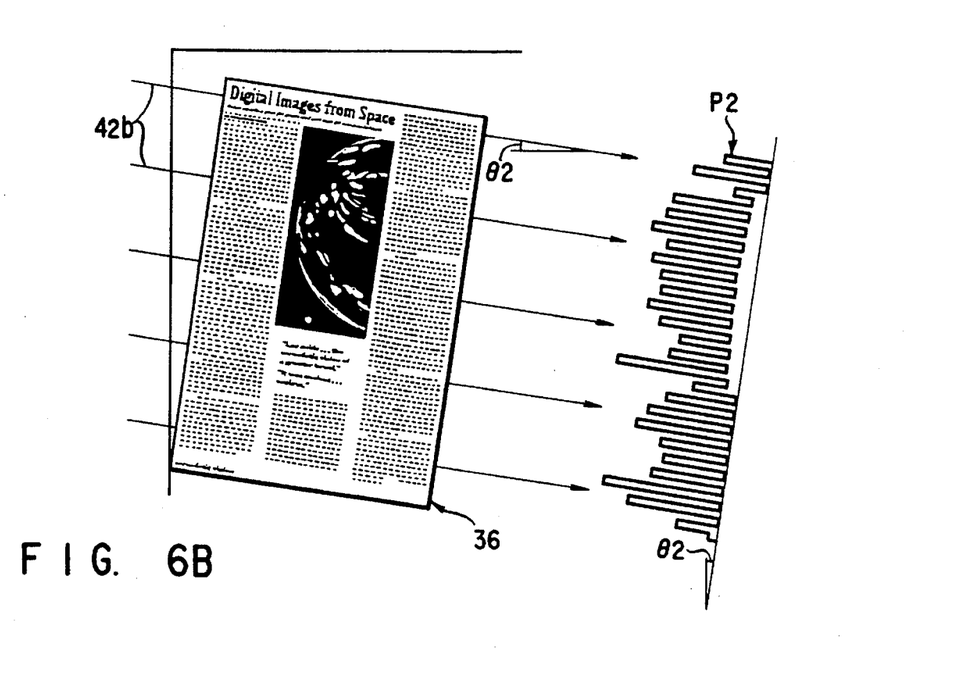

FIGS. 6A and 6B show two possible examples P1, P2 of the distribution pattern of the transition numbers Ni, which determine the complexities C1, C2, in cases where $\alpha$ is $+\theta 1$ and $-\theta 2$, respectively. Imagine the document image 36 is skewed by $\theta = \theta 2$. According to the example of FIG. 6A, $\theta 1 = 20$ degrees, whereas in the example of FIG. 6B, $\theta 2 = -10$ degrees. As shown in FIG. 6A, when $\alpha = +\theta 1$ (=20 degrees), the projecting direction of the plurality of parallel scanning lines 42a is angularly deviated from the direction of text lines of document image 36; accordingly, the transition number Ni of each scanning line remains moderate at a relatively smaller level. As a result, the transition numbers Ni is low in distribution on the whole as illustrated in FIG. 6A. This indicates that the complexity C1 is small.

In contract, with the example of FIG. 6B, since the direction of scanning lines 42b is incidentally identical with the direction of text lines of document image 36, each scanning line 42b runs in parallel with the text lines. When a certain scanning line 42b crosses alphanumeric characters (letters or numerals) of a text line in a manner as shown previously in FIG. 5, a corresponding transition number Ni will be maximum. When, on the other hand, the scanning line 42b extends on the space between two adjacent text lines, the transition number Ni becomes zero because of the presence of no alphanumeric characteristics to be crossed with the line 42b therein. This results in that the transition numbers Ni thus computed are greater in distribution. A resultant distribution pattern (i.e., complexity C2) thus exhibits a plurality of sharp peaks that occur corresponding to respective text lines as shown in FIG. 6B. (The illustration of peaks in FIG. 6B is intentionally rough in peak width for purposes of facilitating a visual presentation; actually, such peaks appear at an increased frequency substantially corresponding to respective text lines.) At this time, the complexity C2 is maximized. The document skew detector 26 holds and stores therein all the complexities C obtained with respect to respective ones of all the scanning directions. Skew detector 26 searches for the maximum one among the complexities, and determines it as the document skew angle e thus detected. In this example, $\Theta = \theta 2 = -10$ degrees.

Figure 11:
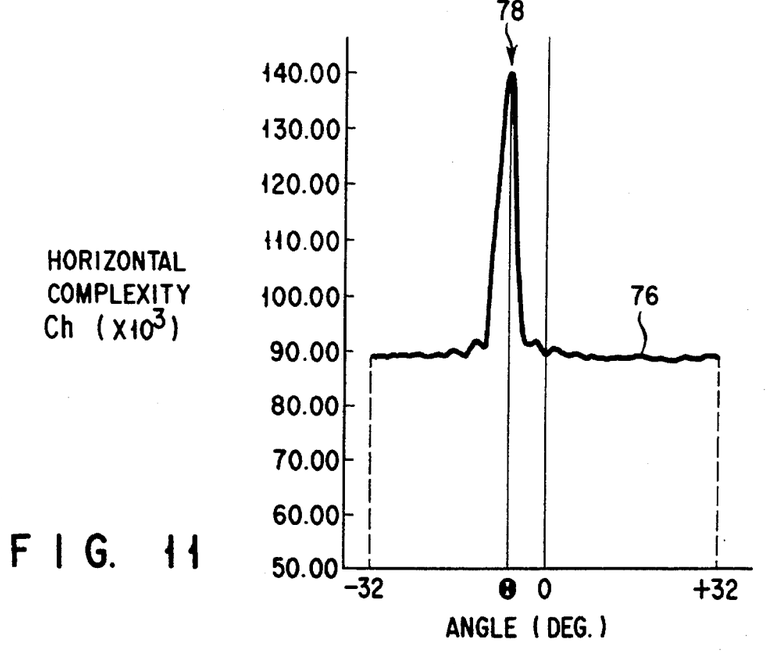
FIGS. 11 and 12 are graphs presenting exemplary distribution characteristics of horizontal and vertical complexities Ch, Cv, which may be possibly obtained in two document skew detectors shown in FIG. 10.

In accordance with the skew detection concept as described above, the document skew detector 26 of FIG. 1 computes the complexity C (the distribution of transition numbers Ni) of the presently selected local region Rext with respect to each selected direction of each of the parallel scanning lines 42 that are varied angularly at the predetermined angle resolution $\sigma$. When the detected skew angle $\Theta$ of the input document 14 falls within the range of change in the scanning directions as defined by Inequality 3 (i.e., $-\alpha < 0 < +\alpha$), and when the selected local region Rext is likely to be a pure text region, the maximum complexity Cmax of a distinguishing sharp peak exists among the resultant complexities C thus computed. Representing the distribution of such complexities C in a graph, the maximum complexity Cmax exhibits the highest sharpness in the distribution pattern (as is similar to that shown in FIG. 11 presented later in regard to another embodiment of the invention). In other words, the maximum complexity Cmax has a distinguishing peak-shaped distribution pattern. Upon observation of such peak pattern, the document skew detector 26 determines a corresponding angle whereat the maximum complexity Cmax appears as the skew angle $\Theta$ of the document image. Skew detector 26 then supplies this detection result to the skew evaluator 28 connected thereto.

If, unfortunately, the maximum complexity Cmax fails to appear among the computed complexities C, the document skew detector 26 makes a decision that the detection of maximum complexity Cmax ends unsuccessful. In such case, document skew detector 26 requests local region extractor 22 to select another one from among a plurality of "candidates" for the local region Rext being stored therein and to supply it to image data processor 14 and skew detector 26. These devices perform similar operations for the another local region in a manner as explained previously. Such operations will be repeated until the maximum complexity Cmax is found out successfully with respect to a local region Rext.

The skew evaluation unit 28 evaluates the value of the document skew angle Θ (the scanning direction θ whereat the maximum complexity Cmax takes place) being supplied from the document skew detector 26, and then determines whether or not a skew correction is to be performed for the image of input document 14 on the basis of the evaluation results. Typically, the allowable skew range is predefined as follows:

$$-v \leq \Theta \leq +v. \qquad (4)$$

The evaluation is carried out by examining or investigating whether the detected skew angle Θ satisfies Inequality 4. If detected angle Θ satisfies Inequality 4, that is, when the skew angle of the document image is relatively small, a decision is made where any skew correction is unnecessary. A corresponding evaluation result signal is generated and supplied to the output terminal 30 of document skew detection section 18. On the other hand, if the detected angle Θ does not satisfy Inequality 4, that is, when the skew angle of document image is relatively large, evaluator 28 makes a decision that the skew correction is necessary. A corresponding signal is supplied to output terminal 30, together with the angle information indicative of the skew correction degree (i.e., the value of the detected skew angle Θ).

In responding to the signal supplied at the output terminal 30 of the document skew detection section 18, the document skew corrector 32 performs a skew correcting operation in such a manner that the image of the input document 14 is rotated by −Θ so as to compensate for the detected skew angle Θ. A resulting skew-corrected document image is then supplied to the optical document reader 34. Optical document reader 34 carries out an intended character-read operation (a pattern recognition operation, for example) for the corrected document image at an improved reliability.

The significant feature of the document skew detection apparatus 10 is that an improved accuracy of document-skew detection can be achieved when an input document 14 contains non-text portions partially and randomly, and even when the document image information generated by the document image acquisition section 12 is lower in signal-to-noise ratio. This can be said because a skew detection is done with respect to a local region Rext only, which is extracted from the image of input document 14 as a specific partial region containing pure text line portions that occupy almost the entire area of local region Rext. Even if the skew detection ends unsuccessful with respect to one local region Rext presently selected, a similar detection operation will be repeated with respect to other ones of the plurality of "candidates" for a local region Rext until the skew detection becomes successful. This can assure that a document skew angle is detected at an enhanced reliability.

Another significance of the embodiment 10 is that, as exemplarily shown in FIGS. 6A and 6B, the complexity C obtained on the basis of the transition numbers Ni computed with respect to each of the scanning lines 42a, 42b at a selected scanning angle θ includes the square component of the term (Ni−M) as indicated in Equation 1. This serves to emphasize the variation in the entire distribution pattern of complexity, which may lead to a speed-up of the detection of the maximum complexity Cmax and an improvement in the detection accuracy. The inclusion of the square component of the term (Ni−M) can, in other words, suppress or prevent the document skew detection from being adversely affected by the presence of non-text portions such as photographic images, painted pictures or line drawings, and/or the mixture of increased noise components in the input document image. This results in that the document skew detection can be further improved in performance.

A still another significance of the embodiment is that the above high-reliability document skew detection can be accomplished at an improved processing speed without need of any highly powerful large-scale computer equipment. This may be resulted from (1) the execution of a smear treatment by the black-pixel integrator 20 to a binary coded document image, (2) the limited application of the skew detecting operation to a local region Rext being presently selected in the document skew detector 26, and (3) the reduction in the total processing amount due to the simplification and rationalization of the algorithm for computing the complexity C by the document skew detector 26 (i.e., the setting of suitable intervals of the parallel scanning lines 42, the selection of the angle resolution σ of scanning direction, the preliminary restriction of the range of angle detection). This will expand the applicability of the present invention.

Figure 7:
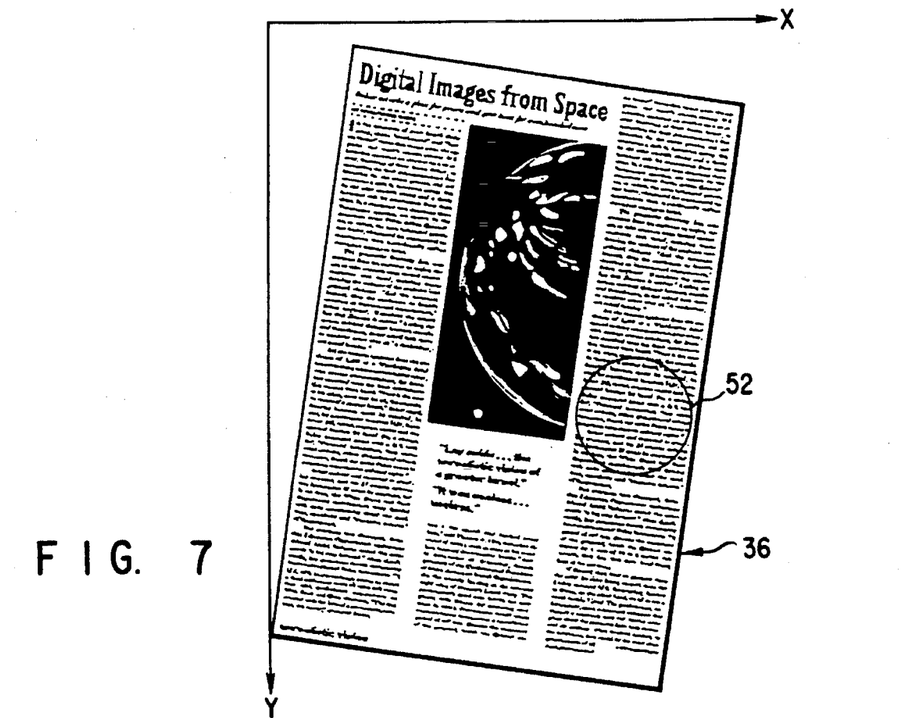
FIGS. 7 and 8 show one possible modification of the local region Rext extracting operation to be performed by the local region extraction unit of FIG. 1.

Some possible modifications of the extracting operation of a suitable local region Rext from the input document image to be performed by the local region extractor 22 shown in FIG. 1 will now be described below. Now, let's see FIG. 7, wherein the smear-processed document image 36 of FIG. 2 is introduced again.

Figure 8:
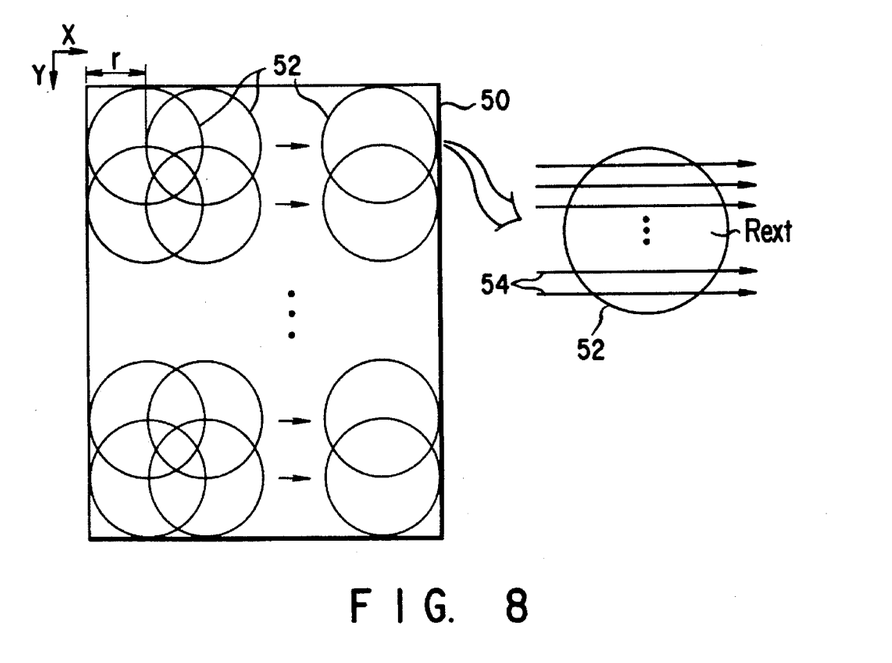

As shown in FIG. 8, an entire region 50 of a rectangular shape containing the skewed document image 36 orients in the horizontal and vertical directions X, Y. Firstly, a circular region 52 having a predetermined radius r is defined within entire region 50. This circle 52 is moved intermittently, at a certain shift pitch, from the top left corner of rectangular region 50 toward the top right corner thereof in the horizontal direction X, while circuit 50 maintains inscription with the top line of region 50. With the embodiment, radius r may be selected to be equivalent approximately to one eighth of the width W of input document 14; accordingly, the diameter (=2r) of circle 52 is a quarter of width W. The shift pitch is selected to be equal to radius r, for example. When reached at the top right corner of region 50, circular region 52 is shifted vertically by a preselected pitch, which may also be equal to radius r. Similar horizontal and intermittent movements are performed. The combination of such horizontal and vertical movements of circular region 52 will be repeated until it reaches the bottom right corner of rectangular region 50.

While the circular region 52 is intermittently shifted in the horizontal and vertical directions, a document image region surrounded by the circle of region 52 is extracted at each of the shifted positions of the region 52. The extracted image region is used as the local region Rext as described previously. As shown in the right half of FIG. 8, the circular-shaped local region Rext is scanned along a preselected number of scanning lines 54 being parallel with the horizontal direction X. A transition number Ni is computed with respect to each of scanning lines 54 at a selected angle in substantially the same manner as has been explained previously; then, the sum total ΣNi is computed therefor in each circular region. Computation results are held in unit 22 in a computer-searchable manner. After the computation of a complexity is completed with respect to a certain circular local region Rext at a selected position, region 52 is moved at a different position. The computation of a complexity is performed similarly. Such complexity computation and movement of circular local region 52 are repeated alternately until region 52 reach the bottom right corner of rectangular region 50.

After the total-sum computation is completed with respect to the local region Rext defined by the circuit 52 that has reached the bottom right corner of the rectangular region 50, a specific one is selected from all the resultant total sum ΣNi values, which is equivalent to or greater than a predetermined reference value. The resultant ΣNi values are sorted in an order of greatness, to identify a predetermined number (ten, for example) of the upper ΣNi's in the sort list. Assuming circular local regions corresponding to the identified ΣNi's as pure text regions, these ΣNi values are distinguished from the others as "candidates" for a local region Rext. Preferably, these local-region candidates are spatially separated from one another at a certain distance. One of these candidates is designated and then supplied as a selected circular local region Rext to the document skew detector 26 shown in FIG. 1. The principle or basic concept of a skew detection processing for this local region is similar to that described previously with reference to FIGS. 6A and 6B. The employment of such circular local region can improve in reliability the extraction of a pure text image portion from the input document image, and, simultaneously, leads to an improvement of the document skew detecting operation in efficiency.

Figure 9:
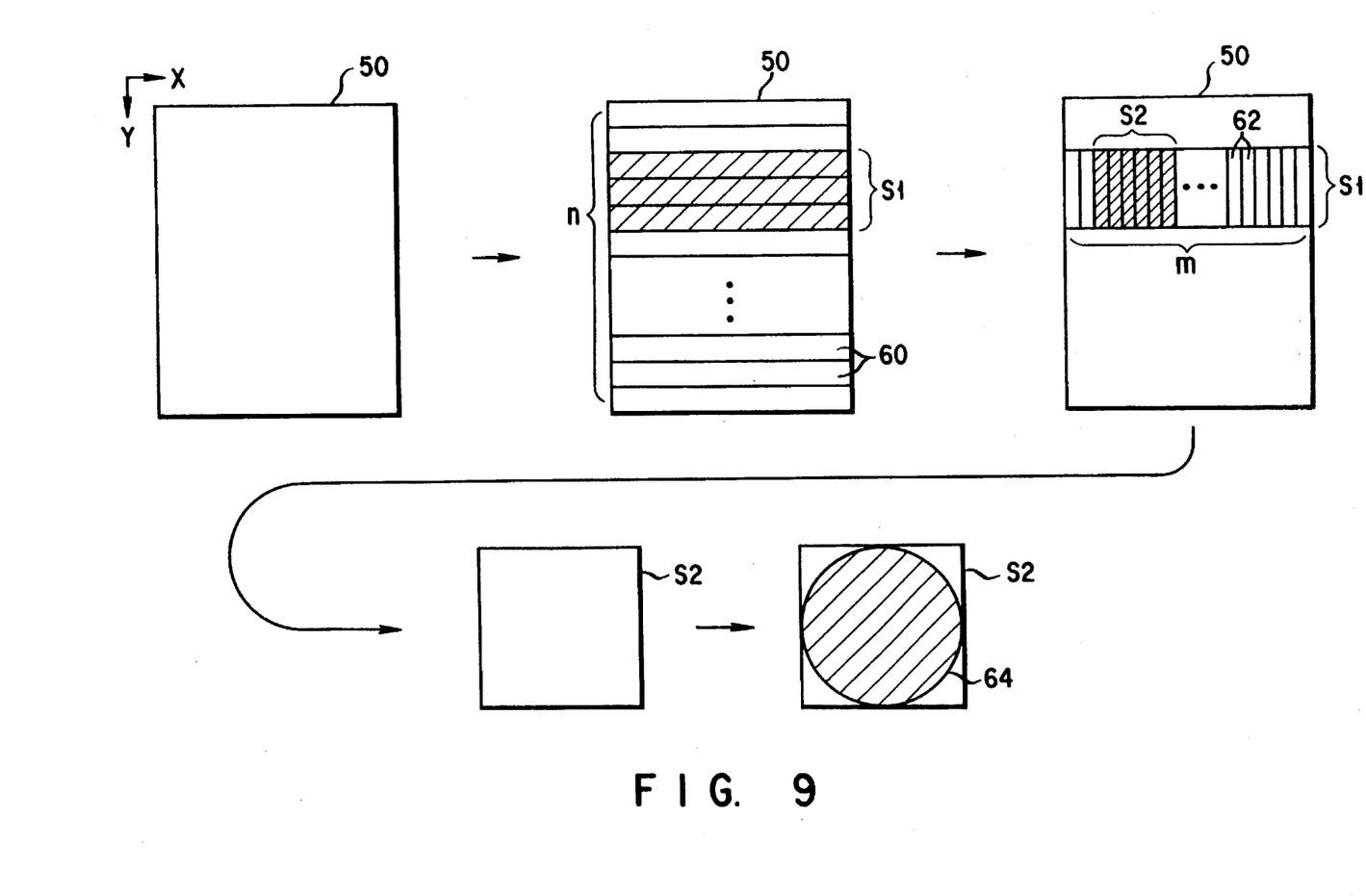
FIG. 9 illustrates another possible modification of the same.

The extraction operation of a local region Rext may be modified as shown in FIG. 9. The rectangular region 50 is sliced in the horizontal direction x to have a plurality of (n) stripe-shaped sections 60 being constant in width. Horizontal transition numbers Ni(hrz) are then computed for a respective one of these stripe sections 60 to obtain the regional sum of resulting transition numbers Ni(hrz). A preselected number (three, in this embodiment) of continuously neighboring stripe sections 60 are bundled together to form a widened stripe region S1; as a result, a plurality of wide stripe regions S1 are defined within the rectangular region 50 while they are permitted to partly overlap one another. The sum of transition numbers Ni(hrz) is computed in each region S1. A specific region S1 is selected which is greatest in sum value among the bundled regions S1.

Subsequently, as shown in FIG. 9, the selected region S1 is further subdivided in the vertical direction Y into an array of a plurality (m) of narrow stripe subregions 62. Vertical transition numbers Ni(vrt) are then computed with respect to each of these subregions. A preselected number (six, for example) of continuously neighboring narrow subregions 62 are bundled together to prepare a substantially square-shaped region S2; this results in that square regions S2, which may overlap one another, are defined in the array of subregions 62. Vertical transition numbers Ni(vrt) are computed with respect to each of the square regions S2. A specific one, which has the greatest sum value, is identified and selected from regions S2. A decision is made where this selected region S2 is the most likely pure text portion of the input document image. Thereafter, an inscribed circle 64 is defined within the selected region S2. This circular region is finally determined as a local region Rext, which is then supplied to the document skew detector 26 of FIG. 1. With such an arrangement, the total amount of computation required for the extraction of local region Rext can be decreased to enhance the efficiency of the document skew detecting operation of the invention.

Figure 10:
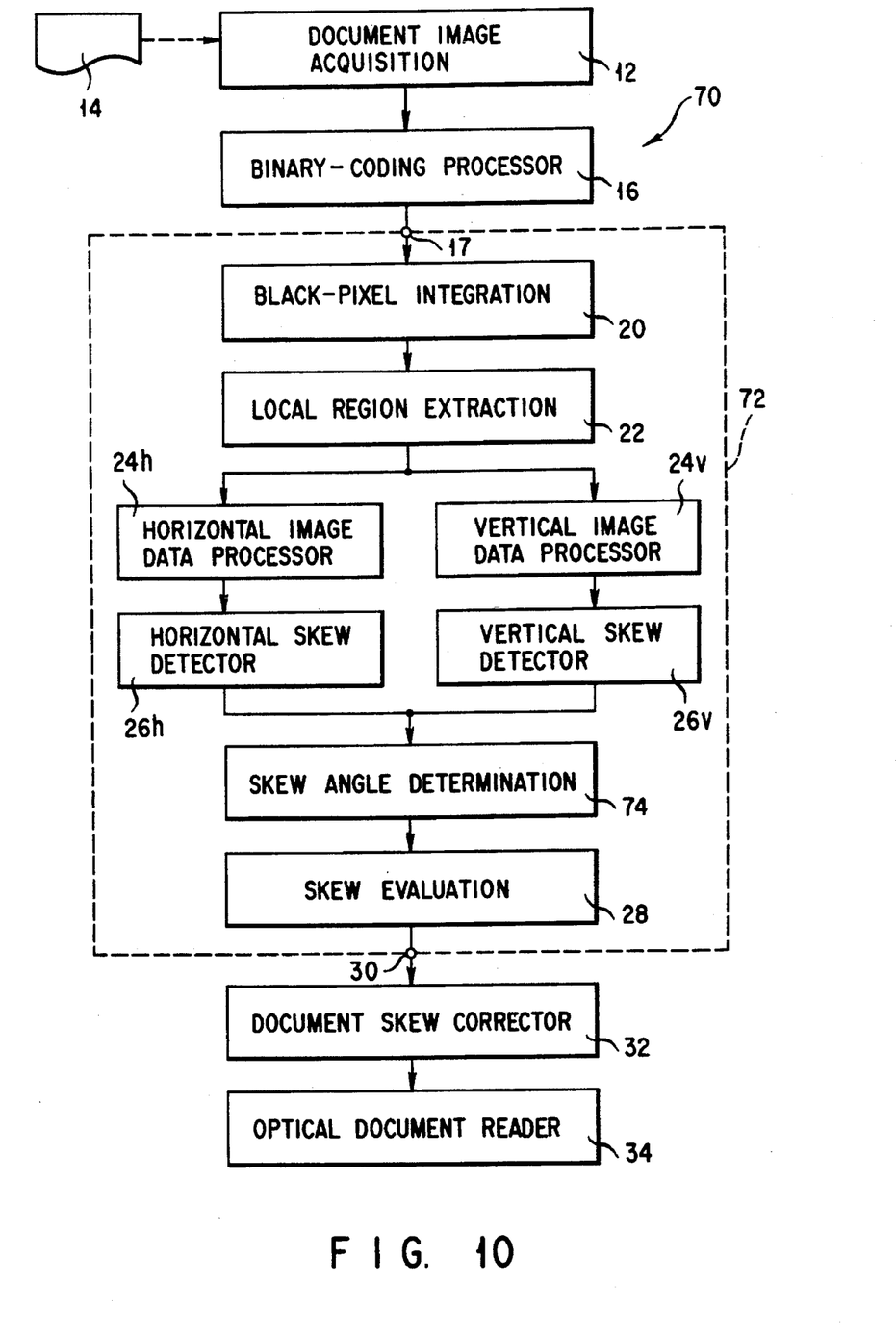
FIG. 10 is a block diagram showing the overall construction of a document skew detection apparatus in accordance with another embodiment of the invention.

A document skew detection apparatus 70 shown in FIG. 10 is similar to that of FIG. 1 with the document skew detection section 18 of FIG. 1 being replaced with a document skew detection section 72 that is capable of detecting the document skew angle both in the horizontal direction and the vertical direction of an input document image. More specifically, skew detection section 72 includes a horizontal image data processor 24h and a vertical image data processor 24v. The suffices "h" and "v" stand for horizontal and vertical, respectively. Skew detection section 72 also includes horizontal and vertical skew detection units 26h, 26v, and a skew angle determination unit 74 being coupled to an output of two skew detectors 26h, 26v. Skew detection units 26h, 26v are associated with image data processors 24h, 24v, respectively. Skew angle determination unit 74 has an input coupled to outputs of detectors 26h, 26v, and an output coupled to the skew evaluator 28.

While the apparatus 10 of FIG. 1 requires a presumption or premises that the predominant angle of orientation (typically, the direction of text lines) of the input document 14 is known in advance to be either one of the horizontal or vertical directions, the document skew detection apparatus 70 shown in FIG. 10 is free from the premise and is therefore more enhanced in performance and applicability. This significance comes from a first feature wherein the horizontal and vertical image data management operations can be executed independently of each other by two data processors 24h, 24v, and a second feature wherein the horizontal and vertical document skew detecting operations can be performed independently of each other by two detectors 26h, 26v.

More specifically, assuming that the local region extractor 22 of FIG. 10 extracts a circular local region Rext in the manner as has been explained previously with reference to FIGS. 7 and 8, the data processors 24h, 24v perform the aforementioned data management operations for this local region Rext independently of each other in the horizontal and vertical directions X and Y. The data management of each data processor 24h, 24v is basically similar to that of the data processor 24 of FIG. 1 with the applied directions of processors 24 being different from each other. Data processors 24h, 24v generate at their outputs compressed text image signals of local region Rext, which are then supplied to skew detectors 26h, 26v, respectively.

The operation of each of the horizontal and vertical document skew detectors 26h, 26v is similar to that of the skew detector 26 shown in FIG. 1 with the applied directions being different from each other. Horizontal document skew detector 26h computes the horizontal complexity Ch of a presently selected circular local region Rext with respect to every one of scanning line directions that are intermittently changed by a predetermined angular resolution σ, with the horizontal direction X being as a reference direction, within the range defined by Inequality 3 (i.e., $-\alpha<0<+\alpha$) in substantially the same scheme as described with reference to FIGS. 6A and 6B. When a plurality of horizontal complexities Ch are computed, the distribution of these complexities Ch is determined. A decision is made to determine whether the maximum horizontal complexity Ch(max) is present which exhibits a distinguishable peak distribution pattern.

During the operation of horizontal document skew detector 26h, the vertical document skew detector 26v computes the vertical complexity Cv of the selected circular local region Rext with respect to every one of scanning line directions that are intermittently changed by a predetermined angular resolution σ, with the vertical direction Y being as a reference direction, within the range defined by Inequality 3 ($-\alpha<90<+\alpha$, in this case) in substantially the same scheme as described with reference to FIGS. 6A and 6B. On the basis of a plurality of vertical complexities Cv thus computed, the distribution of these complexities is determined. A decision is then made to determine whether the maximum vertical complexity Cv(max) is found which exhibits a distinguishable peak distribution pattern.

Figure 12:
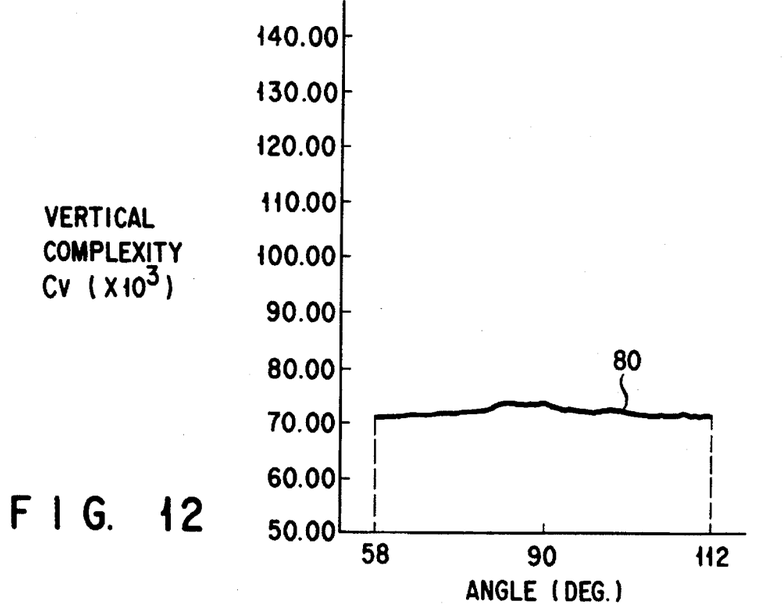

FIGS. 11 and 12 show exemplary distribution characteristics of complexities Ch, Cv obtained by the horizontal and vertical document skew detectors 26h, 26v. In this case, a complexity distribution curve 76 extending with the horizontal direction X being as its center exhibits a sharp peak portion 78 at a specific angle Θ as shown in FIG. 11. The top point of peak 78 is the maximum complexity Ch(max). On the other hand, as shown in FIG. 12, a vertical complexity distribution curve 80 extending with the vertical direction Y being as its center remains moderate in variation as a whole, and does not have any peak portions. A decision is made by the skew angle determination unit 74 of FIG. 10 to finally determine the specific angle Θ as the skew angle of document image on the basis of the shape of these characteristic curves 78, 80. If no peak appears in both the distribution of horizontal complexities Ch and that of vertical complexities Cv, another local region is selected from a plurality of alternates or "candidates" for the circular local region Rext; a series of similar operations or computation processes for the skew angle detection are then applied to the another local region Rext being alternatively selected.

The present invention is not limited to the above-described specific embodiments and may be practiced or embodied in still other ways without departing from the spirit or essential character thereof.

What is claimed is:

1. An apparatus for determining a skew angle of an input document that contains at least a plurality of lines of text characters and a non-text portion, said apparatus comprising:

input means for generating an image of the input document;

detection means coupled to said input means for detecting a skew angle of said plurality of lines of text characters, comprising means for extracting at least one region including only text lines from the document with respect to a plurality of scanning lines which across the document image at selected angles that vary intermittently from a reference angle, means for computing complexity at each of angles, means for finding out a characteristic parameter in a distribution of the parameters in the region, and means for determining a corresponding angle, at which said characteristic parameter appears, as the skew angle of the input document; and output means coupled to said detection means for generating a signal indicative of the skew angle thus determined.

2. The apparatus according to claim 1, wherein said input means comprises:

image processor means for generating a binary coded image of the input document, which contains a plurality of first picture elements having a first density level to depict contents of the document and a plurality of second picture elements having a second density level.

3. The apparatus according to claim 2, wherein said computing means computes said parameters by determining a plurality of parallel scanning lines across said extracted local region at a selected angle, counting a number of crossing points of each scanning line with the first picture elements to generate resultant count values of the scanning lines, and computing a complexity on the basis of the count values with respect to the selected angle, thereby obtaining complexities with the selected angle being varied intermittently.

4. The apparatus according to claim 3, wherein said determining means determines said corresponding angle as the skew angle of the input document, by finding out, from the complexities, a maximum complexity of highest sharpness of distribution and a scanning angle at which said maximum complexity occurs, and identifying said scanning angle as said skew angle.

5. The apparatus according to claim 4, wherein said complexity is substantial equal to:

$$(1/N)\cdot\Sigma\{(N_i-M)^2\},$$

where N is a total number of the scanning lines, Ni is a count value of transitions between said first and second picture elements and M is an average value of the count values at the selected angle.

6. The apparatus according to claim 5, further comprising:

skew corrector means coupled to said output means, for analyzing whether the skew angle thus detected falls within a predetermined range, and for, if such analysis is unsuccessful, rotate the document image by a specific angle compensating for said skew angle.

7. The apparatus according to claim 5, further comprising:

additional detection means coupled to said input means for detecting said skew angle, comprising means for iteratively computing another group of said parameters, with respect to a respective one of a plurality of scanning lines that cross the document image at selected angles that vary intermittently from another reference angle, means for finding out a characteristic parameter in a distribution of the parameters, and means for determining a corresponding angle thereof as the skew angle of the input document.

8. The apparatus according to claim 7, wherein said reference angle defines one of vertical and horizontal directions, and said another reference angle defines the other of the directions.

9. The apparatus according to claim 8, further comprising:

skew determination means coupled to said detection means and said additional detection means, for receiving detection results from them, and for finally determining the skew angle of the input document on the basis of the detection results in such a manner that, when a most distinguishable parameter having a highest peak sharpness is present in one of the vertical and horizontal directions, a corresponding angle at which said most distinguishable parameter appears is determined as the skew angle of the input document.

10. The apparatus according to claim 2, wherein said extracting means extracts said at least one region by dividing said document image into an array of rows and columns of sections, defining one or a plurality of parallel scanning lines crossing each of said sections, counting a number of transitions of each scanning line between the first and second picture elements in each section to generate resultant count values of the scanning lines, obtaining a sum of the count values with respect to every one of said sections, and determining, as said local region, one of said sections being greater in value than the remaining ones of said sections.

11. The apparatus according to claim 2, wherein said extracting means extracts said at least one region by defining a movable circular region in said document image, defining one or a plurality of parallel scanning lines crossing the circular region at a selected position, counting a number of transitions of each scanning line between the first and second picture elements in each section to generate resultant count values of the scanning lines, obtaining a sum of the count values, iteratively effecting similar operations while the circular region is moved at different positions in said document image, and determining, as said local region, the circular region being positioned at a specific position at which the sum of count values is greater than those obtained at the remaining positions of said circular region.

12. The apparatus according to claim 2, wherein said extracting means extracts said at least one region by slicing said document image into a plurality of stripe-shaped sections in a first reference direction, defining one or a plurality of parallel scanning lines crossing each of said sections, counting a number of transitions of each scanning line between the first and second picture elements of each section to generate resultant count values of the scanning lines, obtaining a sum of the count values with respect to each of said sections, identifying a preselected number of adjacent sections being maximum in the sum of count values, dividing said adjacent sections into a plurality of subsections in a second reference direction transverse to the first direction, computing a sum of similar count values with respect to each subsection, and determining, as said local region, a rectangular region consisting of a predetermined number of neighboring subsections being maximum in the sum of count values.

13. A document skew determination tool for facilitating the recognition of the contents of a printed document comprising the steps of:

generating a binary coded image of the document containing a plurality of black picture elements distributed among white picture elements to depict pure text lines and non-text portions of the document;

modifying the binary coded image so that certain ones of the black picture elements satisfying a predetermined condition are integrated together to generate a coarse document image being decreased in resolution;

extracting a local region from the document image, said local region containing pure text lines occupying an almost entire area thereof;

detecting a direction of orientation of the text lines in said local region; and determining an angular difference between a detected direction and a reference direction as a skew angle of the printed document.

14. The tool according to claim 13, wherein said detecting step includes the substeps of:

scanning said local region at selected angles of projection;

computing a respective complexity with respect to each one of the selected angles;

verifying resultant complexities to determine whether a specific complexity which is greatest in value and in sharpness of peak distribution is present among the complexities thus obtained; and identifying a corresponding angle at which said specific complexity appears.

15. The tool according to claim 14, wherein said complexity is a function of crossing numbers of a plurality of parallel scanning lines crossing said local region at a selected angle of projection with respect to the black picture elements aligned along said scanning lines.

16. The tool according to claim 15, wherein said complexity is defined by:

$$(1/N) \cdot \Sigma \{(N_i - M)^2\},$$

where N is a total number of the scanning lines, $N_i$ is a count value of transitions between said first and second picture elements and M is an average value of a count value of the crossing numbers.

17. The tool according to claim 15, wherein said local region is one of an array of rows and columns of rectangular sections divided from said document image.

18. The tool according to claim 15, wherein said local region is a circular region that is defined at a certain position in said document image.

* * * * *